United States Patent [19]

Perry et al.

[11] Patent Number: 5,468,433
[45] Date of Patent: Nov. 21, 1995

[54] PROCESS FOR MANUFACTURING A PADDED ELEMENT USING A COVER PREFORMING MANDREL

[75] Inventors: Brian Perry, Maple; Frank Donato, Weston, both of Canada

[73] Assignee: Woodbridge Foam Corporation, Mississauga, Canada

[21] Appl. No.: 153,957

[22] Filed: Nov. 18, 1993

[51] Int. Cl.⁶ .......................... B29C 44/06; B29C 51/00
[52] U.S. Cl. .......................... 264/46.4; 264/46.6; 264/257; 264/321
[58] Field of Search .......................... 264/46.4, 46.6, 264/46.8, 321, 512, 257, 554

[56] References Cited

U.S. PATENT DOCUMENTS

| | | | |
|---|---|---|---|
| 3,703,572 | 11/1972 | Bellasalma | 264/46.8 |
| 3,950,462 | 4/1976 | Shaffer et al. | 264/46.8 |
| 4,053,545 | 10/1977 | Fay | 264/46.8 |
| 4,211,590 | 7/1980 | Steward et al. | 264/46.5 |
| 4,287,143 | 9/1981 | Sears et al. | 264/46.8 |
| 4,508,774 | 4/1985 | Grabhoefer et al. | 264/321 |
| 4,740,417 | 4/1988 | Tornero | 264/511 |
| 4,786,447 | 11/1988 | Kouda | 264/46.4 |
| 4,860,415 | 8/1989 | Witzke | 29/91.1 |
| 4,874,649 | 10/1989 | Daubenbuchel et al. | 264/46.4 |
| 4,886,630 | 12/1989 | Sugiura et al. | 264/46.8 |
| 4,923,653 | 5/1990 | Matsuura et al. | 264/46.4 |
| 4,976,414 | 12/1990 | Yanagishita | 264/46.4 |
| 5,037,591 | 8/1991 | Rohrlach et al. | 264/46.8 |
| 5,082,609 | 1/1992 | Rohrlach et al. | 264/46.4 |
| 5,089,191 | 2/1992 | Hughes | 264/46.5 |
| 5,096,639 | 3/1992 | Hughes | 264/46.5 |
| 5,132,063 | 7/1992 | Hughes | 264/46.8 |
| 5,219,513 | 6/1993 | Addeo et al. | 264/510 |

FOREIGN PATENT DOCUMENTS

| | | | |
|---|---|---|---|
| 2203273 | 5/1974 | France . | |
| 58-029633 | 2/1983 | Japan | 264/46.8 |

Primary Examiner—Allan R. Kuhns
Attorney, Agent, or Firm—Fitzpatrick, Cella, Harper & Scinto

[57] ABSTRACT

There is disclosed a process for manufacturing a padded element. The process comprises the steps of placing a trim cover on a mandrel, the trim cover having a finished outer surface and an inner surface comprised of a thermoformable foam layer; heating the trim cover to a temperature sufficient to shape the thermoformable foam layer; shaping the trim cover to substantially the same shape as the mandrel to produce a shaped trim cover; transferring the shaped trim cover from the mandrel to a lower mold having shape substantially complimentary to the shaped trim cover; placing an upper mold over the lower mold to define a mold cavity; dispensing a liquid foamable polymeric composition in the mold cavity; and expanding the liquid foamable polymeric composition to fill substantially the mold cavity thereby forming the padded element.

20 Claims, 5 Drawing Sheets

PROCESS FOR MANUFACTURING A PADDED ELEMENT USING A COVER PREFORMING MANDREL

BACKGROUND OF THE INVENTION

1. Field of the Invention

The present invention relates to a process for manufacturing a padded element. More particularly, the present invention relates to a process for manufacturing a unit-type padded element comprising a cushion member adhered, at least in part, to a trim cover.

2. Brief Description of the Prior Art

The methods of assembling and joining a decorative cover to the underlying padding material typically fall within one of the following techniques: mechanically retained assembly, adhesive bonded assembly and foamed-in-place (also known as molded-in-place) assembly. Such assemblies have been used in, for example, vehicle seats and other molded vehicle parts.

In the mechanically retained assembly, the trim or decorative cover is cut and sewn to shape, and thereafter joined to the padding material by means of metal "hog rings" or "C" clips which join molded-in wires in the seat pad to sewn-in wires in the trim cover. Alternatively, the securing means may be "hook and loop" devices (commercially available under the trade name Velcro) wherein the "hook" is molded into the seat pad and the "loop" is either sewn in or laminated onto the trim cover material. Unfortunately, this mechanically retained assembly is deficient. For example, the method of manufacturing this assembly is relatively complicated in that auxiliary wires or "hooks" must be molded into or glued on the seat pad. Further, auxiliary wire pockets or loop sheeting must be sewn in or laminated onto the trim cover material. Still further, the cost of these mechanical auxiliary means is onerous when compared to the cost of the foam padding material and the seat cover material. This results in a seat which is produced in a relatively complicated manner and at a relatively high expense.

In the adhesive bonded assembly, a molded foam seat pad or fabricated seat pad with the desired style and surface contours is located in a die or fixture. An adhesive in the form of a liquid, powder or film is applied to the surface of the pad. The trim cover material is held in a separate fixture and formed to the finished shape using one or more of vacuum (pressure), heat set and steam. The trim cover material with the die fixture is then registered to the pad. Thereafter, application of heat, steam and pressure activates the adhesive and joins the seat pad to the trim cover material. This assembly is deficient in that the method of manufacturing it requires the use of external heat, steam, vacuum and relatively high pressure. Further, this typically requires the use of a relatively expensive and toxic adhesive to bond the seat pad to the seat cover material.

In the foamed-in-place assembly, a mold is used comprising a lower section and an upper section. The trim cover material is located in the lower section of the mold and held in place with mechanical devices and/or with application of a vacuum. An impervious barrier may be applied to the underside of the trim cover to prevent foam penetration into the cover and to permit the vacuum to form fit the cover. Thereafter, liquid polyurethane foam is poured onto the interior surface of the trim cover (i.e. onto the impervious barrier, if present). The upper portion and lower portion of the mold are then closed thereby sealing the mold, and remain closed until the foam is set in the desired shape. During the process, the foam gives off expansion gases and expands substantially upwardly and away from the cover to fill the mold. In the finished item, the expanded foam adheres directly to the impervious barrier (if present). This assembly is deficient in that it requires the use of external pressure and vacuum. The assembly, in many cases, also requires the use of an impervious backing to facilitate positioning and locating the trim cover material in the lower section of the mold and to prevent penetration of the liquid foam through the cover material. Since this method of assembly requires that no venting of expansion gases occur at the surface of the cover material, the use of the impervious backing is required with all cover materials, including vinyl and leather, which, when sewn together become air permeable. Further, the use of the backing results in prevention of "breathing" of the finished system; this is undesirable since it reduces the comfort value of the finished system.

U.S. Pat. Nos. 5,089,191; 5,096,639; and 5,132,063 (TRB and The Woodbridge Process) provided an advance in the art in obviating the need to utilize high temperatures and rigorous vacuum conditions during the production of a padded element. Unfortunately, the processes disclosed in these patents are not ideal for producing a padded element having sharp contours and curves.

In addition to the above-identified deficiencies of the prior art assemblies, extreme care must be taken when working with vinyl and with relatively exotic seat cover materials such as leather. For example, application of excessive heat and steam to leather during the manufacturing of the assembly can permanently denature the leather thereby altering its texture and/or appearance. Further, the application of heat and steam can alter the gloss level of vinyl and also tends to wash out the grain surface.

It would be desirable to have a simple process for the manufacture of a padded element, which process could be used with virtually all conventional cover materials and which could be used to manufacture padded elements having sharp contours and curves in a relatively efficient manner.

SUMMARY OF THE INVENTION

It is an object of the present invention to provide a novel process for the production of a padded element.

It is another object of the invention to provide a novel process for manufacturing a padded element using any of the conventional cover materials without damage thereof during the process.

It is yet another object of the invention to provide a novel process for manufacturing a padded element having sharp contours and curves.

Accordingly, in one of its aspects, the present invention provides a process for manufacturing a padded element comprising the steps of:

(i) placing a trim cover on a mandrel, the trim cover having a finished outer surface and an inner surface comprised of a thermoformable foam layer;

(ii) heating the trim cover to a temperature sufficient to shape the thermoformable foam layer;

(iii) shaping the trim cover to substantially the same shape as the mandrel to produce a shaped trim cover;

(iv) transferring the shaped trim cover from the mandrel to a lower mold having shape substantially complimentary to the shaped trim cover;

(v) placing an upper mold over the lower mold to define a mold cavity;

(vi) dispensing a liquid foamable polymeric composition in the mold cavity; and (vii) expanding the liquid foamable polymeric composition to fill substantially the mold cavity thereby forming the padded element.

In another of its aspects, the present invention provides a process for manufacturing a padded element comprising the steps of:

(i) affixing a trim cover to a mandrel, the trim cover having a finished outer surface and an inner surface comprised of a thermoformable polyurethane foam layer;

(ii) heating the mandrel and the trim cover to a temperature sufficient to initiate shaping of the thermoformable foam layer;

(iii) shaping the trim cover to substantially the same shape as the mandrel to produce a shaped trim cover;

(iv) cooling the shaped trim cover;

(v) transferring the shaped trim cover from the mandrel to a lower mold having shape substantially complimentary to the shaped trim cover;

(vi) placing an upper mold over the lower mold to define a mold cavity;

(vii) dispensing a liquid foamable polyurethane composition in the mold cavity; and (viii) expanding the liquid foamable polyurethane composition to fill substantially the mold cavity thereby forming the padded element.

As used throughout this specification, the term "thermoformable foam", when used in the context of the inner surface of the trim cover, is intended to mean a foam which, when heated to a sufficient temperature, is capable of being shaped and, after cooling, retains substantially the same shape. In the present process, a thermoformable foam is chosen having a thermoforming temperature above the environmental temperature in which the finished part will be used and below the temperature at which the thermoformable foam or other materials to which is adhered will degrade. The preferred thermoformable foam for use as the inner surface of the trim cover is a thermoformable polyurethane foam. Such a foam may be produced using commercially available materials such as specially tailored polyols available from BASF under the tradename Pluracol Polyol 1225. The manner by which the trim cover is manufactured is not particularly restricted. For example, the thermoformable foam may be laminated, preferably flame laminated, to the underside of the trim cover. Alternatively, the thermoformable foam may be adhered to the underside of the trim cover using a conventional adhesive or glue compound, optionally combined with sewing.

Thus, the present process may be used to produce padded elements without the requirement of using excess heat, vacuum and steam. Moreover, the present process is particularly suited to produce padded elements having sharp contours and curves. Such padded elements include vehicle interior parts such as side bolsters, door and quarter trim panel inserts, seat back panels and instrument panel glove box doors. The present process is particularly suited for the production of side bolsters. The ability to produce such padded elements without the need to use excessive heat, vacuum and steam results from initially forming and shaping the trim cover essentially to produce a preform. The liquid foamable polymeric composition is then dispensed in the preform without the requirement for vacuum to hold the shaped trim cover in place, thereby minimizing or eliminating the likelihood of "foam densification".

As is known in the art, foam densification is a phenomenon which occurs when young foam (i.e. foam which has just begun to expand from the liquid state) is forced to expand in an environment which is unable to accommodate the pressure build-up from, inter alia, vacuum used to hold the trim cover (i.e. when the trim cover is permeable) in place and/or the gas given off from the expanding foam mass. This results in the expanding foam mass being "driven" into the trim cover with a force which results in the occurrence of foam densification. When this occurs, the surface of the trim cover, which, in many cases is intended to be the finished surface of the article, has a relatively hard surface which belies the objective of providing a resilient, finished article.

BRIEF DESCRIPTION OF THE DRAWINGS

Embodiments of the present invention will be described with reference to the accompanying drawings in which.

DETAILED DESCRIPTION OF THE INVENTION

Preferred embodiments of the invention will now be described with reference to FIGS. 1–8. In the Figures, like numerals designate like parts.

Figure 1:
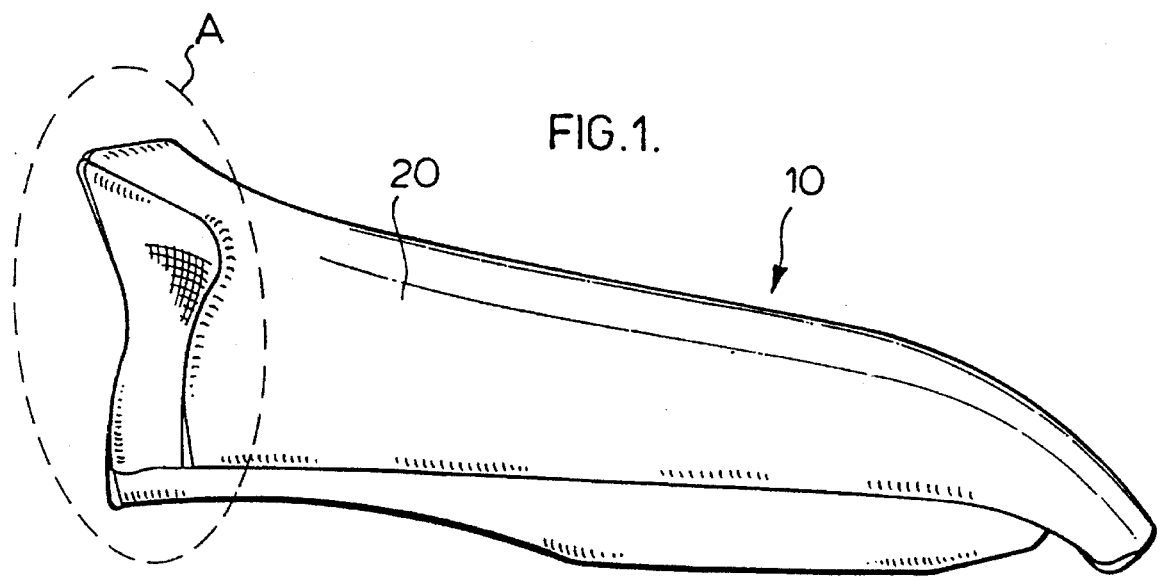
FIG. 1 is a perspective view of a padded element manufactured in accordance with an embodiment of the present process.

With reference to FIG. 1, there is illustrated a padded element in the form of a vehicle side bolster 10 produced in accordance with the present process. Side bolster 10 comprises a trim cover 20 made of a conventional decorative material such as leather, vinyl, cloth and the like. As will be apparent from dash outlined area A in FIG. 1, side bolster 10 comprises a number of sharp contours and curves which are inherent in a part of this nature.

Figure 2:
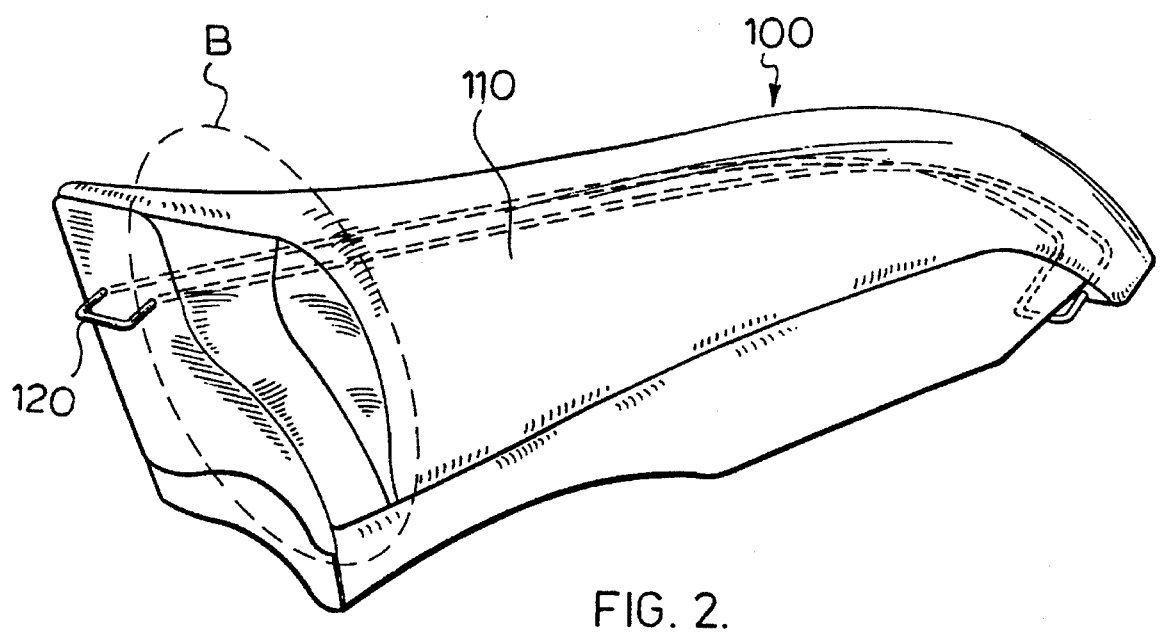
FIG. 2 is a perspective view of a padded element manufactured in accordance with a second embodiment of the present process.

With reference to FIG. 2, there is illustrated another padded element in the form of a vehicle side bolster 100 which comprises a trim cover 110 comprised of a conventional decorative cover material as described above. Side bolster 100 further comprises a frame member 120 (shown partially ghosted and partially protruding) embedded in side bolster 100. As will be apparent from dash outlined area B in FIG. 2, side bolster 100 comprises a number of sharp contours and curves which are inherent in a part of this nature.

The remainder of the specification will be devoted to a detailed description of the production of bolster 10. However, it will be appreciated that the process may be readily adapted for the production of bolster 100 without departing from the spirit of the invention.

Figure 3:
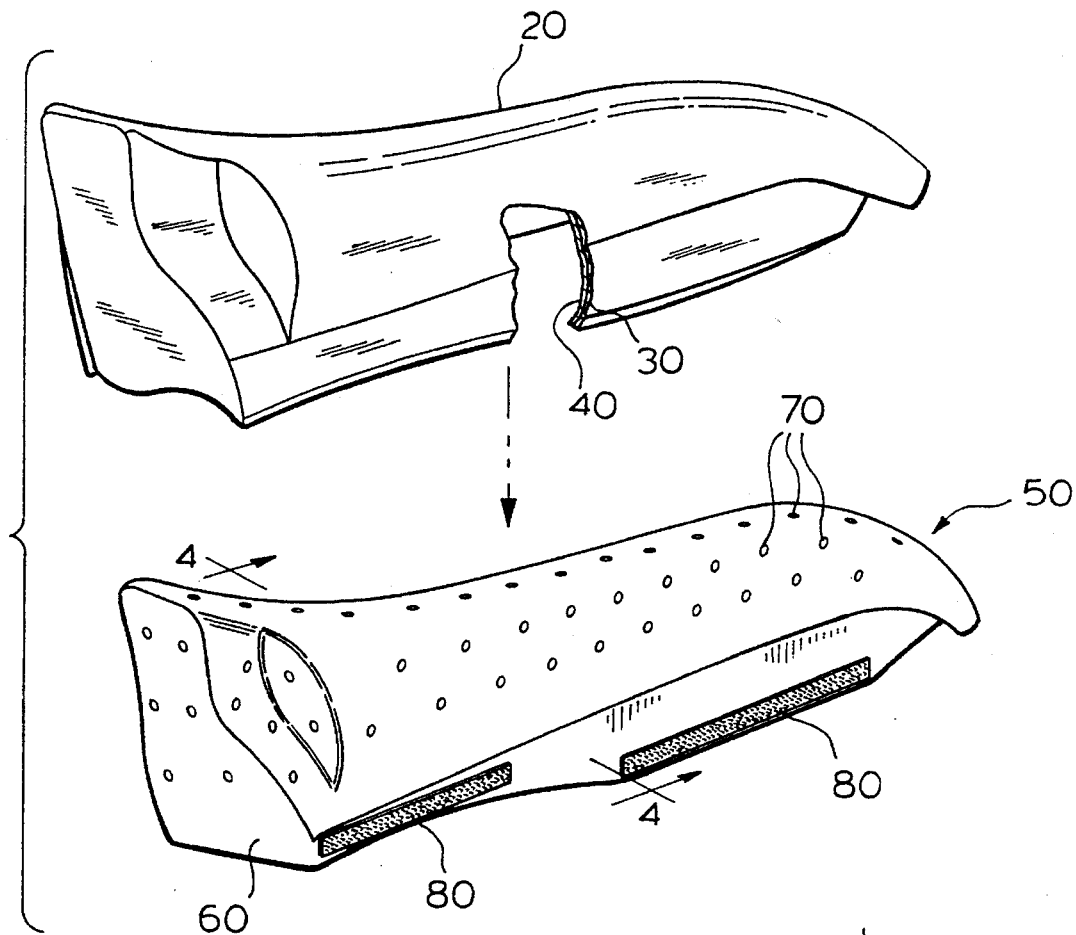
FIG. 3 is a perspective view of one step in the present process.

With reference to FIG. 3, there is illustrated trim cover 20 which comprises a decorative, finished outer surface 30 and an inner surface 40 comprised of a thermoformable foam layer. Also depicted in FIG. 3 is a mandrel 50 comprising a body 60 having a plurality of perforations 70. Mandrel 50 also comprises mechanical retaining means 80 for holding in place trim cover 20. As will be apparent to those of skill in the art, mandrel 50 is substantially hollow and can be made of any suitable material such as wood or metal. Further, as will be apparent, mandrel 50 is contoured to have a shape substantially the same as the finished surface of side bolster 10.

Initially, trim cover 20 is lowered on and affixed to mandrel 50. In the embodiment illustrated, trim cover 20 is affixed to mandrel 50 by conventional "hook and loop" devices. It is not particularly important which of the "hook" and "loop" devices are affixed to a trim cover and a mandrel, respectively. Further, other mechanical retaining means can be used. For example, it is possible to have sharp pins protruding from the lower portion of the mandrel which pierce and hold in place the trim cover during the initial steps of the present process. Other mechanical retaining means are within the purview of those of skill in the art.

Figure 4:
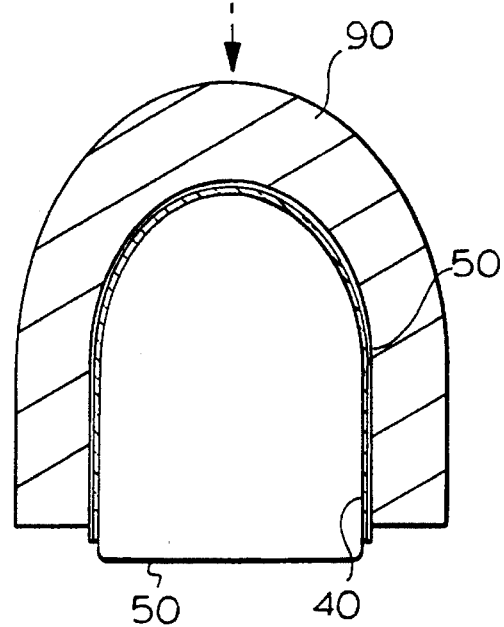
FIG. 4 is a sectional view along line 4—4 of FIG. 3 when a trim cover on a mandrel with an optional form-assist element.

With reference to FIG. 4, there is illustrated a section of the mandrel depicted in FIG. 3 after trim cover 20 has been affixed to mandrel 50. After trim cover 20 has been affixed to mandrel 50, an optional step in the present process is the use of form-assist element 90 which is lowered onto the trim cover/mandrel unit and assists in registering the shape of trim cover 20 to that of mandrel 50. The use of form-assist element 90 is not required in all circumstances and will depend on whether there are a great number of sharp curves and contours in the part to be manufactured.

Once trim cover 20 is affixed to mandrel 50, the unit is heated to a temperature sufficient to shape foam layer 40 which results in shaping of trim cover 20. The temperature utilized is not particularly restricted provided it is sufficient to achieve thermoforming but is not too high to damage the thermoformable foam layer and/or the decorative, finished outer surface of the trim cover. If the thermoformable foam layer is made of a polyurethane foam, it is preferred to heat foam layer 40 to a temperature in the range of from about 80° to about 180° C., more preferably from about 100° to about 140° C., most preferably from about 110° to about 120° C.

The source of heat is not particularly restricted. Preferred embodiments of heat sources (not illustrated) are hot air (both in the form of dry air and/or steam) and water-jacketed heating systems. Regardless, of the heat source, it is preferred that the heat emanate from the hollow interior of mandrel 50 through perforations 70 to foam layer 40. By heating in this manner "from the inside out", the likelihood of damaging the finished, outer surface of the trim cover is reduced.

The length of time which the trim cover/mandrel unit is heated is not particularly restricted provided that it is sufficient to achieve shaping of trim cover 20 to mandrel 50. Preferably, once the temperature at which foam layer 40 may be thermoformed is reached, the temperature is maintained for a period sufficient to enable thermoforming of foam layer 40. The period of heat applied will depend on a number of factors including the source of heat, the thickness of foam layer 40 and the like. The important factor is that foam layer 40 must attain the minimum temperature required for thermoforming of foam layer 40 enabling shaping of trim cover 20.

It will be apparent to those of skill in the art that heating of trim cover 20 can be effected prior to placement on mandrel 50. Thus, the present process includes initially heating trim cover 20 prior to placement thereof on mandrel 50 and, optionally, includes further heating after trim cover 20 is placed on mandrel 50. Accordingly, Steps (i) and (ii) of the present process are reversible.

After trim cover 20 has been suitably shaped to mandrel 50, the heat source is removed or turned off and the temperature of the trim cover/mandrel unit is allowed to decrease below the temperature at which thermoforming occurred. At that point, the shaped trim cover may be removed from the mandrel and used in subsequent steps in the present process.

Figure 5:
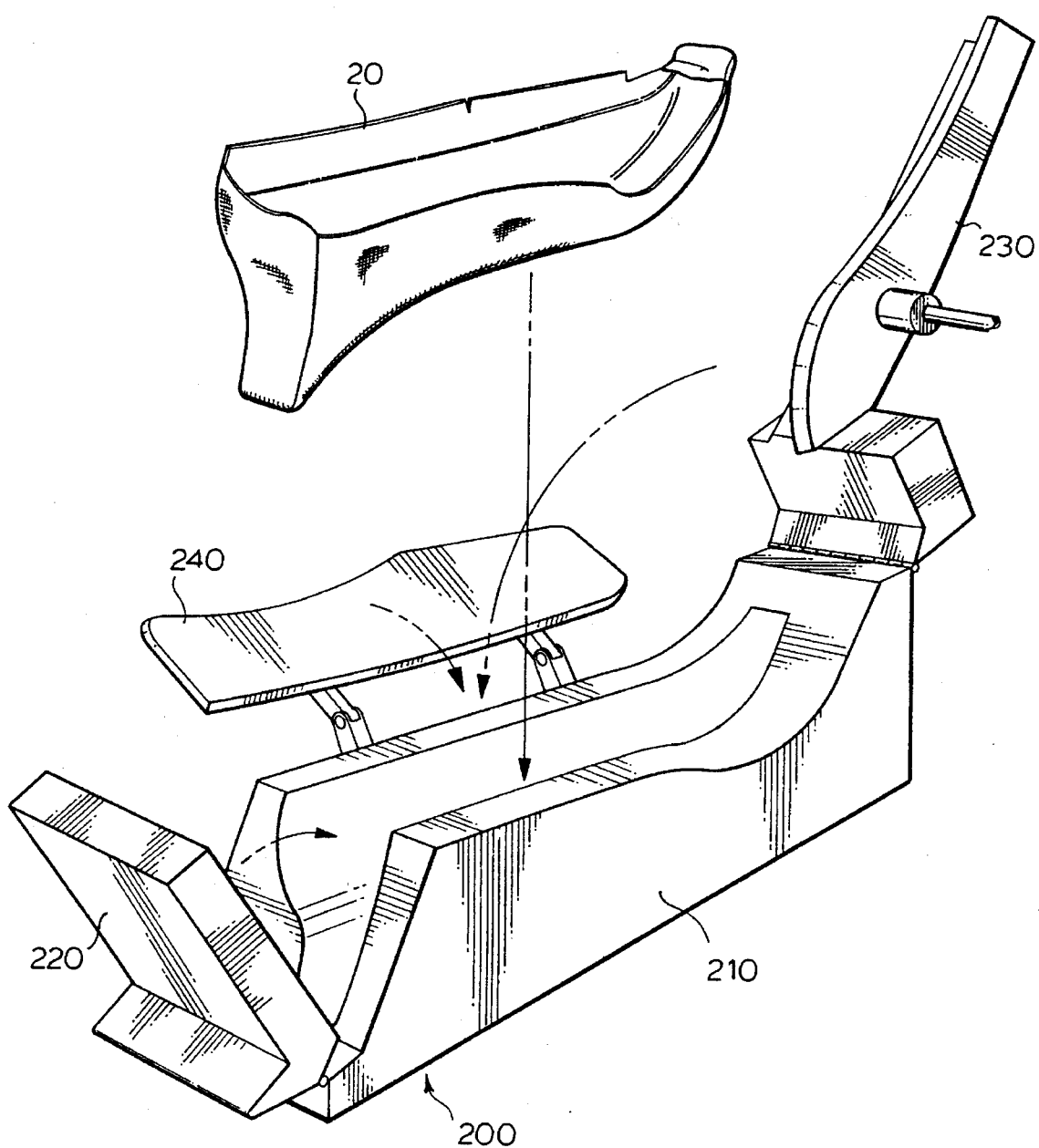
FIG. 5 is a perspective view of a mold suitable for use in the present process.

With reference to FIG. 5, there is illustrated a mold 200 suitable for use in the subsequent steps of the present process. Mold 200 comprises first lower mold 210, second lower mold 220, first upper mold 230 and second upper mold 240. As illustrated, second lower mold 220, first upper mold 230 and second upper mold 240 are hinge mounted to first lower mold 210. As will be apparent to those of skill in the art, mold 200 has been particularly adapted for a production of side bolster 10 resulting in the use of a plurality of upper and lower molds. It will be appreciated that the exact nature of the mold is not particularly restricted and will depend, in almost all cases, on the nature of the part being produced.

With further reference to FIG. 5, shaped trim cover 20, after having been removed from mandrel 50 (FIGS. 3 and 4), is inverted and placed in first lower mold 210, the latter having a shape substantially the same as shaped trim cover 20. Thereafter, in sequence second lower mold 220, second upper mold 240 and first upper mold 230 are swung to a closed position to achieve the mold illustrated in FIGS. 6 and 7. Again, as described above, the particular sequence of closing these molds will depend on their configuration and is not particularly restricted.

Figure 6:
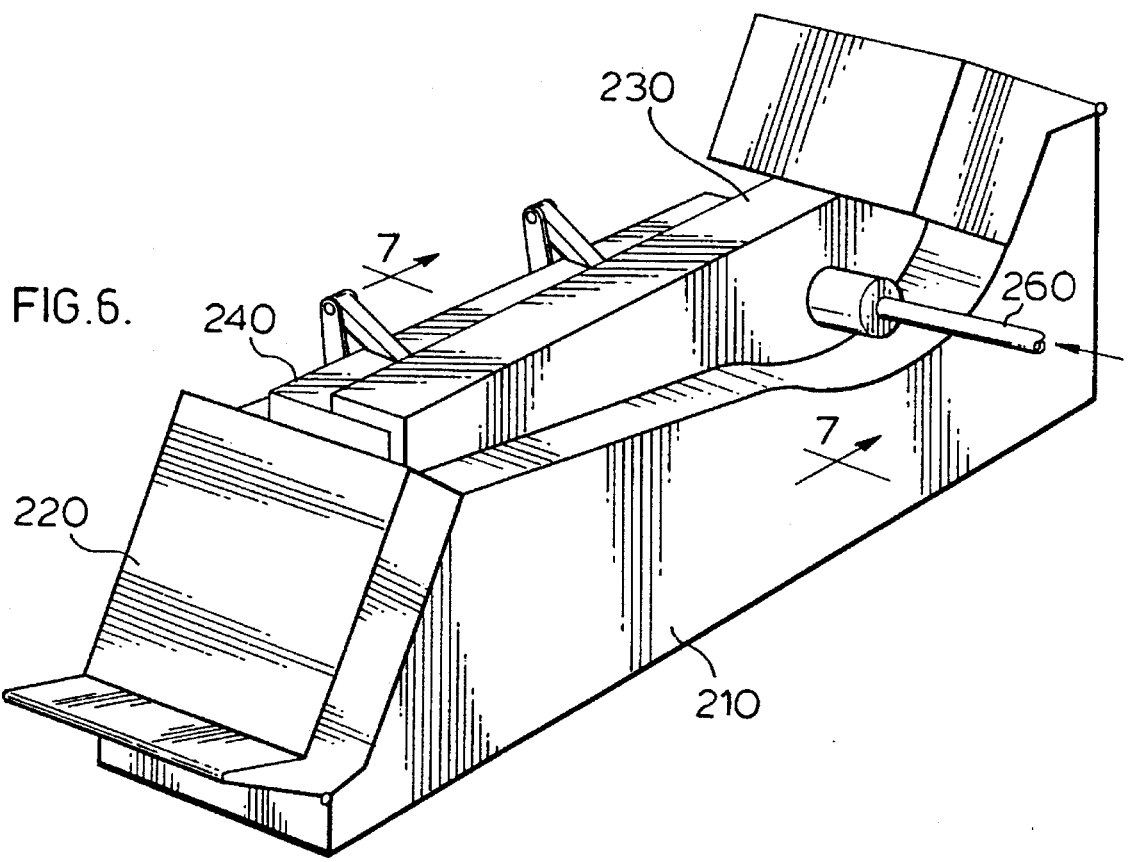
FIG. 6 is a perspective view of a mold in the closed position when used in the present process.
Figure 7:
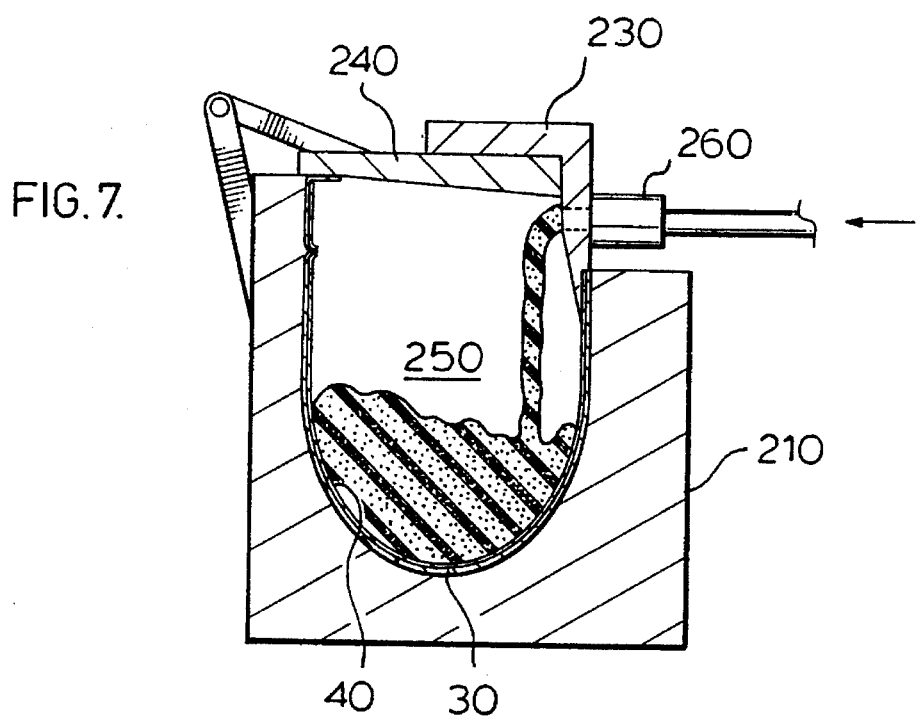
FIG. 7 is a sectional view along line 7—7 of FIG. 6.
Figure 8:
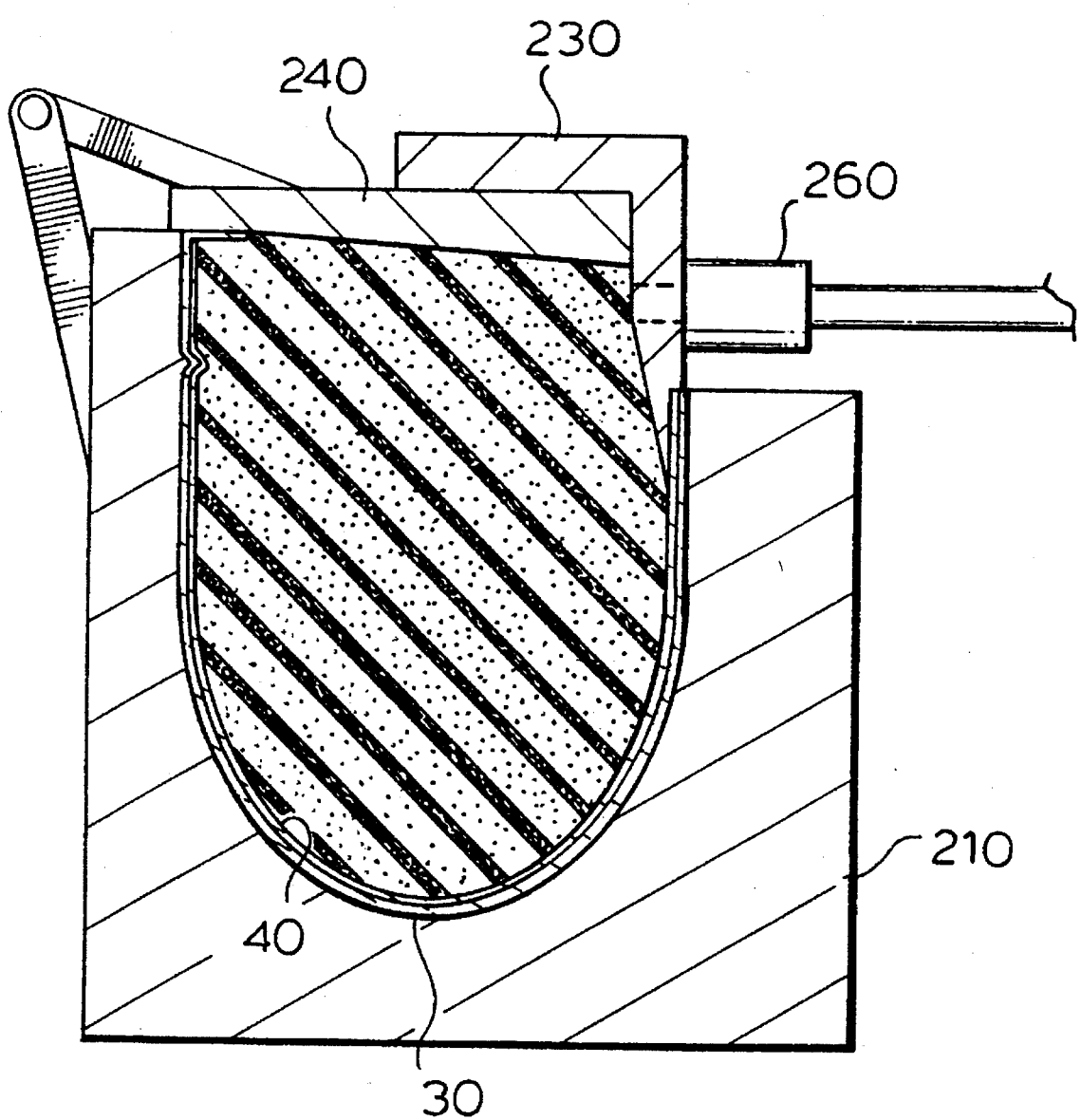
FIG. 8 is an enlarged sectional view similar to FIG. 7 after expansion of the liquid foamable polymeric composition.

As illustrated in FIGS. 6, 7 and 8, second lower mold 220, first upper mold 230 and second upper mold 240 are in a closed position which, in combination with first lower mold 210, forms mold cavity 250. A liquid foamable polymeric composition (not shown) is dispensed through a suitable nozzle 260 in first upper mold 230. The liquid foamable polymeric composition is allowed to expand and fill substantially mold cavity 250 after which second lower mold 220, first upper mold 230 and second upper mold 240 are swung to the open position and finished side bolster 10 is removed from first lower mold 210.

While FIGS. 6, 7 and 8 depict a "closed pour" foaming technique, the present process is equally applicable to "open pour" techniques in which the liquid foamable polymeric composition would be dispensed directly on to foam layer 40 and, prior to complete expansion thereof, the upper mold would be swung to a closed position. Generally, it is preferred to use a closed pour technique in the present process.

The form of liquid foamable polymeric compositions suitable for use in the present process and the manner by which it is dispensed into the open recess of the cushion member is not particularly restricted. Preferably, the foamable polymeric composition comprises a polyurethane. More preferably, the polyurethane is a diphenylmethane diisocyanate (MDI)-based system of low index and of a high molecular weight conventional polyol. Such a system is typically completely "water blown" using highly-catalyzed odorless amines and a cell regulator. Typically, this system cures at room temperature in about three minutes or less. Alternatively, the polyurethane is a tolylene diisocyanate (TDI)-based system of low index and of a high molecular weight conventional polyol. When such a TDI-based system is used, the cells of the foam in the finished padded element must be substantially open. Opening of such foam cells is within the purview of a person skilled in the art and can be accomplished by any convenient means such as crushing, kneading, roll pressing, chemical treatment and the like of the padded element while ensuring that the trim cover is not damaged during this step. It will be appreciated that the liquid foamable polymeric composition may comprise a mixture of MDI-based and TDI-based systems.

The present process can be used to manufacture a variety of padded elements in addition to side bolsters for vehicle interiors. Non-limiting examples of such padded elements include: components of vehicle seats such as the seat cushion, the backrest and the headrest; components of other types of seat systems such as those used in boats, snowmobiles, and in office furniture; pillar covers; and padded interior door and quarter trim panels in vehicles.

The present process can be used with virtually any cushion member which is made from a resilient material. The preferred foam cushion member is made from a polymer foam, more preferably polyurethane foam. Alternatively, the cushion member may be made from horsehair or coconut fibers which are resin-filled, or from cotton or jute.

Thus, the present process can be used to produce a padded element in a convenient and efficient manner. There is no requirement to use excess temperature, pressure, vacuum or steam during the present process as there is with the prior art processes discussed hereinabove. The present process is particularly advantageous since it allows for the production of padded elements having sharp contours and curves without the requirement of using vacuum at any point during the process to assist in the formation of such sharp contours and curves.

What is claimed is:

1. A process for manufacturing a padded element comprising the steps of:
   (i) placing a trim cover on a mandrel, the trim cover having a finished outer surface and an inner surface comprised of a thermoformable foam layer;
   (ii) heating the trim cover, while the trim cover is on the mandrel, to a temperature sufficient to shape the thermoformable foam layer;
   (iii) shaping the trim cover to substantially the same shape as the mandrel to produce a shaped trim cover;
   (iv) transferring the shaped trim cover from the mandrel to a lower mold having a shape substantially complementary to the shaped trim cover;
   (v) placing an upper mold over the lower mold to define a mold cavity;
   (vi) dispensing a liquid foamable polymeric composition in the mold cavity; and
   (vii) expanding the liquid foamable polymeric composition to fill substantially the mold cavity thereby forming the padded element.

2. The process defined in claim 1, wherein said upper mold and said lower mold are closed prior to dispensing said liquid foamable polymeric composition.

3. The process defined in claim 1, wherein said upper mold and said lower mold are closed after dispensing said liquid foamable polymeric composition.

4. The process defined in claim 1, wherein said mandrel comprises means to retain said trim cover in place.

5. The process defined in claim 1, wherein said trim cover is heated prior to being affixed on said mandrel.

6. The process defined in claim 1, wherein said mandrel comprises a hollow body having a plurality of perforations.

7. The process defined in claim 1, wherein said thermoformable foam layer is a polyurethane foam.

8. The process defined in claim 7, wherein said trim cover is heated to a temperature in the range of from about 80° C. to about 180° C.

9. The process defined in claim 7, wherein said trim cover is heated to a temperature in the range of from about 100° C. to about 140° C.

10. The process defined in claim 7, wherein said trim cover is heated to a temperature in the range of from about 110° C. to about 120° C.

11. The process defined in claim 1, wherein said trim cover is air impermeable.

12. The process defined in claim 1, wherein the finished outer surface of said trim cover is made of at least one of leather and vinyl.

13. The process defined in claim 1, wherein said trim cover is air permeable.

14. The process defined in claim 1, wherein the finished outer surface of said trim cover is made of cloth.

15. The process defined in claim 14, wherein said cloth is a reticulated fabric.

16. The process defined in claim 1, wherein said polymeric composition comprises polyurethane.

17. The process defined in claim 1, wherein said padded element is a component of a vehicle interior.

18. The process defined in claim 6, wherein step (ii) comprises heating from the interior of the mandrel and through said perforations.

19. A process for manufacturing a padded element comprising the steps of:
   (i) affixing a trim cover to a mandrel, the trim cover having a finished outer surface and an inner surface comprised of a thermoformable polyurethane foam layer;
   (ii) heating the mandrel and the trim cover, while the trim cover is on the mandrel, to a temperature sufficient to initiate shaping of the thermoformable foam layer;
   (iii) shaping the trim cover to substantially the same shape as the mandrel to produce a shaped trim cover;
   (iv) cooling the shaped trim cover;
   (v) transferring the shaped trim cover from the mandrel to a lower mold having a shape substantially complementary to the shaped trim cover;
   (vi) placing an upper mold over the lower mold to define a mold cavity;
   (vii) dispensing a liquid foamable polyurethane composition in the mold cavity; and
   (viii) expanding the liquid foamable polymeric composition to fill substantially the mold cavity thereby forming the padded element.

20. A process for manufacturing a padded element comprising the steps of:
   (i) placing a trim cover on a mandrel, the trim cover having a finished outer surface and an inner surface comprising a thermoformable foam layer;

(ii) heating the trim cover to a temperature sufficient to shape the thermoformable foam layer;

(iii) shaping the trim cover to substantially the same shape as the mandrel to produce a shaped trim cover;

(iv) cooling the shaped trim cover to produce a cooled trim cover which retains its shape independent of the mandrel;

(v) transferring the shaped trim cover from the mandrel to a lower mold having a shape substantially complementary to the shaped trim cover;

(vi) placing an upper mold over the lower mold to define a mold cavity;

(vii) dispensing a liquid foamable polymeric composition in the mold cavity; and (viii) expanding the liquid foamable polymeric composition to fill substantially the mold cavity, thereby forming the padded element.

* * * * *